(No Model.) 2 Sheets—Sheet 1.
W. D. SMITH.
BICYCLE BRAKE.
No. 588,023. Patented Aug. 10, 1897.
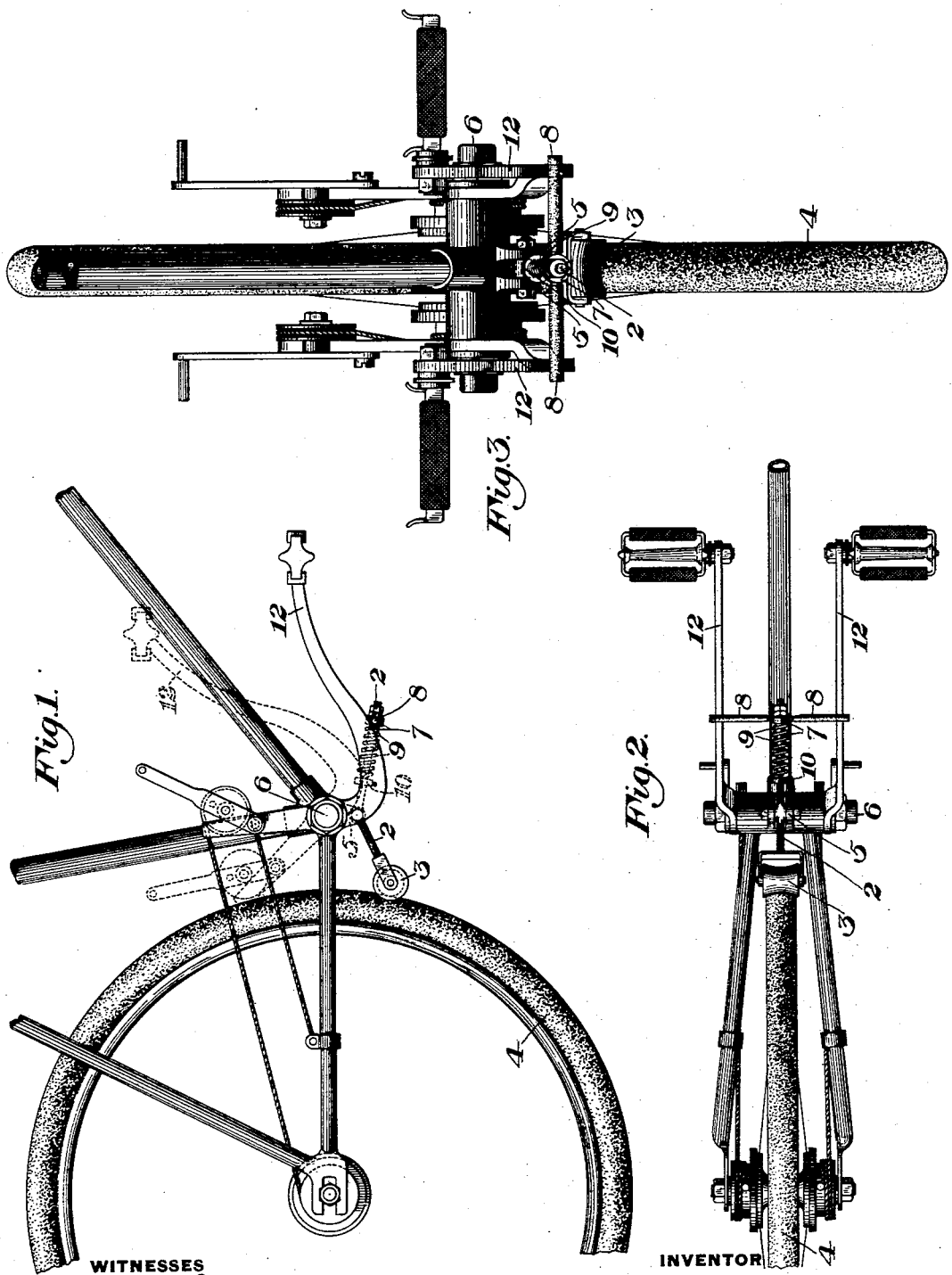
WITNESSES
INVENTOR
William D. Smith
by Bancroft & Bancroft
his attorneys.

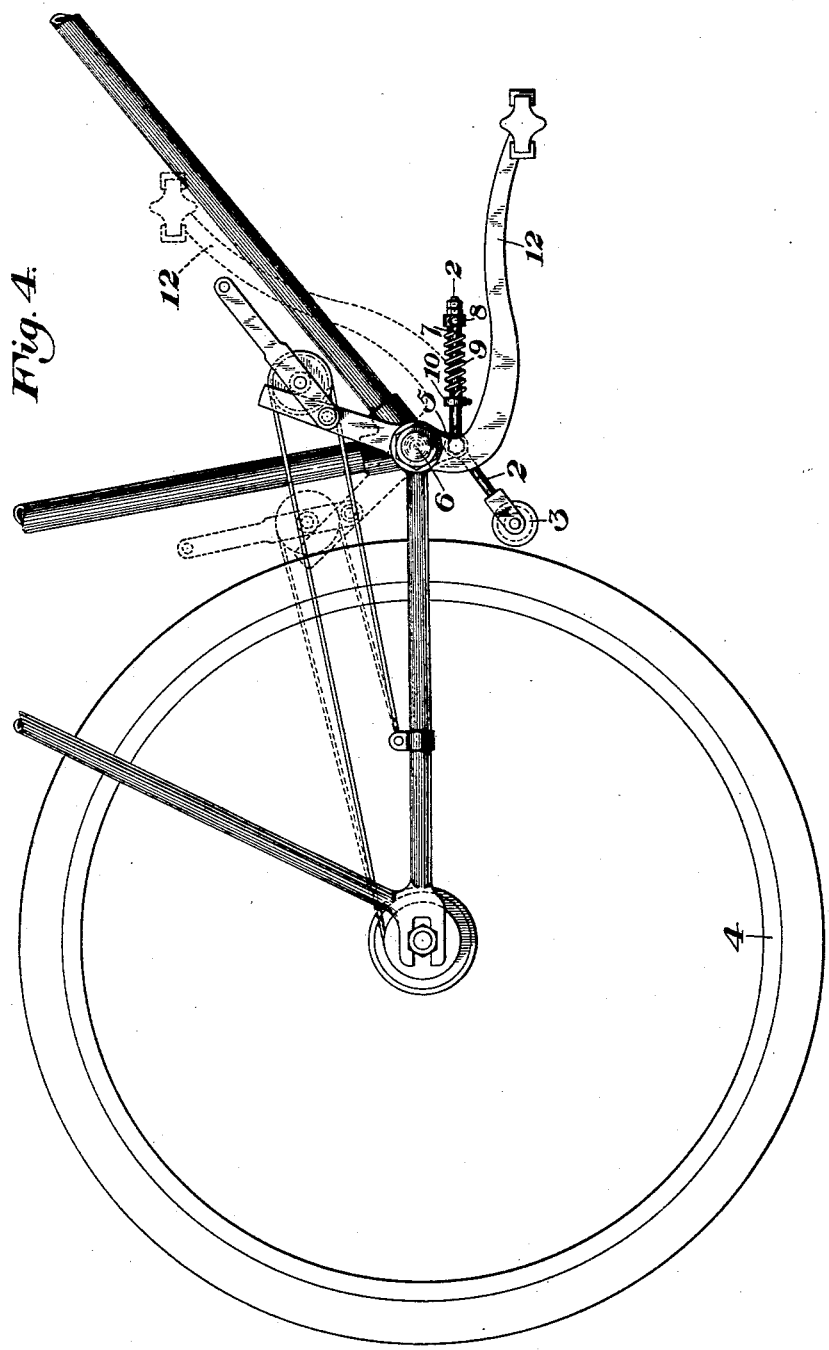

UNITED STATES PATENT OFFICE.

WILLIAM D. SMITH, OF DENVER, COLORADO.

BICYCLE-BRAKE.

SPECIFICATION forming part of Letters Patent No. 588,023, dated August 10, 1897.

Application filed November 19, 1896. Serial No. 612,670. (No model.)

*To all whom it may concern:*

Be it known that I, WILLIAM D. SMITH, of Denver, in the county of Arapahoe and State of Colorado, have invented a new and useful Improvement in Bicycle-Brakes, of which the following is a full, clear, and exact description, reference being had to the accompanying drawings, forming part of this specification, in which—

Figure 1 is partial side elevation of my improved driving-gear. Fig. 2 is a bottom plan view, and Fig. 3 is a sectional front elevation, on a larger scale, of the mechanism shown in Fig. 1. Fig. 4 is a side elevation of the rear wheel and driving-gear, the pedals being shown in full lines in coasting position.

My improvement consists in a novel construction and combination, with the driving mechanism of safety-bicycles, of a device for retarding or arresting the motion of a bicycle.

My improved bicycle-brake is designed to be attached to the frame of the machine in such a manner that it may be operated by a simultaneous depression of both of the driving-levers and so that the rider may exert the whole weight of his body or any less degree of pressure at will to apply the brake without putting the strain on the mechanism which occurs when braking is effected by what is known as "back-pedaling," where the pedals are self-operated against the force or weight applied to them by the rider.

My improved brake consists of a rod 2, which is bifurcated at its lower extremity, so as to receive between the forks of the bifurcation a grooved roller 3, the curvature of the groove being such as to enable it to press in a suitable manner against the tire of the driving-wheel 4. To the rod 2, at a short distance above the bifurcation, is rigidly secured a lug 5, by which the brake-rod 2 is pivoted to the under side of the axle-hanger 6 of the bicycle, as shown in Fig. 1, but in such relation to the driving-wheel 4 that when not in use the brake-roller 3 is not in contact with its tire. On the brake-rod 2, near its upper extremity, is a loose socket 7, into which the upper extremity of the brake-rod 2 is inserted, so as to work freely therein, the socket having a cross-piece extending therefrom at right angles to the rod and forming the two brake-arms 8 8. A spiral spring 9 surrounds the brake-rod below the arms 8 8 of the socket and is attached at one end to the upper end of the socket and at the lower end to a movable ring 10 on the rod 2, which ring is screwed to the rod and is adjustable, so as to increase or diminish the force of the spring 9. By this arrangement the brake-arms are capable of a limited movement of partial rotation on the brake-rod 2 by pressure applied to either one of the brake-arms 8 8, and when the pressure is removed it will resume its former position thereon, and when simultaneous downward pressure is applied to both of the brake-arms the brake-rod will turn on its pivot so as to bring the brake-roller into contact with the tire of the driving-lever of the bicycle.

It is obvious that this brake can be very readily attached to or detached from the bicycle by removing the pivot-bolt. The operation of my improved brake is as follows: When attached to the machine as described, the brake-rod 2 extends forward from the axle of the driving-wheel 4 with the brake-arms 8 8 extending laterally beyond and above the driving-levers 12 12 of the bicycle when in a depressed position, provided that the bicycle is so constructed and arranged that the driving-levers operate independently of each other, as is the case in the improved safety-bicycle-driving mechanism invented by me and for which I have an application for Letters Patent pending, Serial No. 597,675.

When in the position above stated and shown in Fig. 2, the brake-arms being beneath and extending over the driving-levers, if it is desired to apply the brake one of the brake-levers is allowed to rise above the brake-arm immediately above it, the arm turning on its socket on the brake-rod 2 and allowing the lever to pass upward. The other brake-lever is then allowed to rise and pass over the brake-arm immediately above it, and then both brake-levers being simultaneously depressed and having the brake-arms 8 8 underneath them the brake-rod 2 is turned on its pivot and is pressed with any degree of force which the driver can exert against the tire of the driving-wheel. By rising up and standing with both feet on the pedals of the driving-levers the rider can, if he chooses, apply his whole weight to the application of the brake.

The simplicity, convenience of application and of removal, and efficiency of this brake are its great advantages.

I claim—

1. The combination with the driving-wheel of a safety-bicycle having independently-acting brake-levers, of a brake mechanism capable of being pivotally attached to the brake-frame and consisting of a brake-rod carrying at its lower end a grooved brake-wheel and at its upper end a cross-piece pivotally attached thereto, said cross-piece extending at right angles to the rod, extending beyond the vertical plane of motion of the driving-levers, and connected with a spring operating to restore it to its normal position after each operation of the brake, so as to permit the brake-levers alternately to pass above the arms of the cross-piece and thus engage them and apply the brake by the simultaneous depression of both driving-levers; substantially as described.

2. As a detachable brake for safety-bicycles, the combination of the brake-rod 2, grooved roller 3 at the lower end of the brake-rod, and oscillatory cross-piece 8 at the upper end, and the spring 9, constructed and arranged substantially as and for the purpose described.

In testimony whereof I have hereunto set my hand.

WILLIAM D. SMITH.

Witnesses:
H. M. CORWIN,
WARREN W. SWARTZ.